Dec. 1, 1959 R. M. SHIRK ET AL 2,915,375
REACTOR FOR HYDROCARBON CONVERSIONS
Filed March 13, 1956 2 Sheets-Sheet 1

INVENTORS.
Robert M. Shirk,
Robert G. Craig &
Albert W. Hoge
BY William H...
ATTORNEY.

United States Patent Office 2,915,375
Patented Dec. 1, 1959

2,915,375

REACTOR FOR HYDROCARBON CONVERSIONS

Robert M. Shirk and Robert G. Craig, Wilmington, Del., and Albert W. Hoge, Swarthmore, Pa., assignors to Houdry Process Corporation, Wilmington, Del., a corporation of Delaware Application March 13, 1956, Serial No. 571,163

Claims priority, application Great Britain October 17, 1955

6 Claims. (Cl. 23—288)

The present invention relates to a reactor for effecting hydrocarbon conversions such as the dehydrogenation of hydrocarbons in the preparation of butadiene for use in the manufacture of synthetic rubber and the preparation of butylene for the production of alkylate as a blending stock.

Although not limited thereto, the reactor is especially applicable to hydrocarbon conversion systems comprising multiple stages and embodying a battery of reactors or converters which are operated in an adiabatic cycle designed to maintain a balance between the endothermic heat requirement for the hydrocarbon conversion and the exothermic heat of regeneration required for the removal by combustion of the carbonaceous deposit formed on the catalyst during the hydrocarbon conversion.

The reactor is particularly adapted for use in systems having multiple fixed-bed reactors operating continuously on repeated cycles of reaction and regeneration, with intermediate evacuation, purging and catalyst reduction, all of which may be controlled by time-cycle control apparatus of known design.

Heretofore, it has been a practice to provide batteries of reactor vessels of cylindrical shape arranged in horizontal position. With such arrangement, regardless of the location of the inlet and outlet nozzles, it is difficult to obtain uniformity of distribution of gaseous material to all portions of a supported bed of catalyst extending across the reactor at an intermediate level. Furthermore, the cylindrical type reactor introduces special problems in connection with the construction of a refractory support for the fixed catalyst bed. For these and other reasons, such reactors have not proved completely satisfactory from the standpoint of uniformity of gas distribution throughout the catalyst bed, simplicity of fabrication, and overall economical construction.

A further problem inherent in the design of cylindrical reactors as heretofore employed has been that of protecting the bed from disruption as a result of the direct impingement of high velocity streams of incoming gaseous material directly upon the surface thereof.

In accordance with the present invention, the foregoing disadvantages are to a major extent overcome by providing a reactor vessel of generally ellipsoidal configuration arranged with its axis of rotation vertical, and having a single inlet nozzle for all gaseous material charged to the bed, which inlet nozzle is adapted to reduce the velocity of the charge stream to a value which will avoid excessive turbulence at the surface of the bed. In addition, the invention embodies the provision of suitable baffle means to deflect the incoming gas stream away from the central region of the bed.

For a fuller understanding of the invention reference may be had to the following specification and claims taken in connection with the accompanying drawing forming a part of this application, in which;

Figure 1:
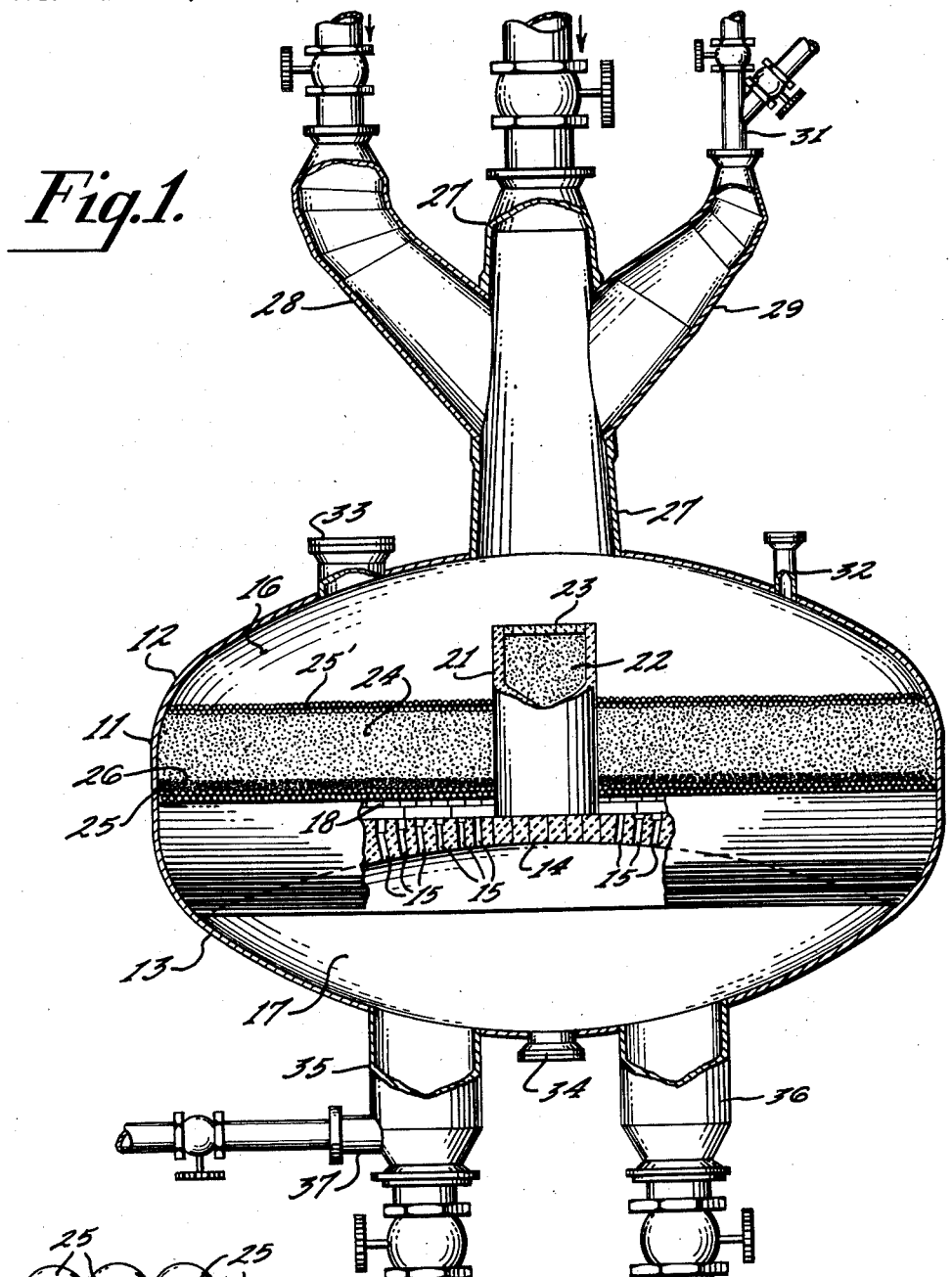
Fig. 1 is an elevation view, in partial section, showing the structural details of the reactor and the associated nozzles and conduits for supplying reactants and catalyst to the reactor vessel and for removing catalyst and the gaseous products of conversion and regeneration.
Figure 2:
Fig. 2 is an enlarged fragmentary section of the perforate tile facing covering the catalyst-supporting arch or dome, showing the relation thereto of the balls of inert material comprising the bottom layer of loose material supporting the catalyst bed.

In Fig. 1 the reactor comprises a relatively-short cylindrical section 11 provided with upper and lower ellipsoidal heads 12 and 13, respectively. The relative proportions of the cylindrical and ellipsoidal sections are such that the reactor, as a whole, closely approximates a true ellipsoid. Extending across the reactor vessel in the upper portion of the lower ellipsoidal head 13, there is provided a catalyst-supporting grid comprising a refractory brickwork arch or dome 14 which is concave on the underside and flat on top. The brickwork is of open checkered construction so as to provide a plurality of uniformly-distributed gas passageways 15 which afford gaseous communication between the reaction zone 16, comprising the region of the vessel above the arch, and a plenum or gas-collecting manifold 17, comprising the region of the vessel beneath the arch. As to the masonry arch 14, any pattern of construction which has the strength necessary to support the weight of the bed and the forces resulting from the pressure drop therethrough, and which provides openings for gas flow between the reaction zone 16 and the plenum 17 may be used. The flat horizontal top of the arch is surfaced with a shallow layer of perforate tile 18 having vertically extending passageways, such as the tapered frusto-conical openings 19 shown in Fig. 2.

A hollow cylindrical structure of tile or brick 21 extends axially upward from the central surface portion of the brickwork arch 14. The cylinder is filled with inert material 22 and is closed at its upper end with a surface layer of tile or brick 23. The structure 21 forms a pier or baffle which serves to deflect the gaseous material introduced axially downward through the top of the reactor vessel, as will hereinafter be described, thereby providing uniform distribution of the gaseous material radially outward toward the sides of the reactor vessel.

A fixed annular bed of granular material, generally indicated by the numeral 24, rests upon the perforate tile surface 18 seated above the top of the arch and supported therefrom. The depth of the bed is such that its surface level is slightly above the upper end of the cylindrical portion of the reactor vessel and below the upper end of the pier or baffle 21. Preferably, the baffle 21 projects upwardly a substantial distance above the surface of the bed 24.

Bed 24 comprises four separate and distinct layers of solid particles, the uppermost and the two lowermost layers being relatively shallow and the remaining intermediate layer being relatively deep. The lowermost and uppermost layers 25 and 25' comprise large-size particles of inert solid material, for example, alumina balls or spheres of about ½ to ¾ of an inch in diameter. The layer 26, next to the bottom layer, comprises similar inert material of smaller diameter, such as about ¼ to ⅜ of an inch in diameter. The layers 25, 25' and 26 of inert material serve primarily to confine the main body-portion of the bed 24, which portion comprises a deep layer of catalytic material, and to prevent the catalyst from entering the passageways in the perforate tile 18. The catalytic material comprising the main body of the bed 24 is of an average particle size substantially smaller than the particle size of the layer 26 of inert material. It may comprise, for example, granular pellets having an average diameter of less than ¼ of an inch, such as about ⅛ to 3/16 of an inch. The gas passages 15 extending through the brickwork arch 14 are of relatively-large flow area, so as not to introduce an undesirable pressure drop in the stream of gaseous material flowing downwardly from the reactor bed into the plenum 17.

In order to provide a uniform flow of gaseous material through the layer of perforate tile 18, it is essential that the balls of inert material comprising the bottom layer 25 of the bed are not to any substantial extent positioned so as to block the passageways 19. While blocking of the passageways at a few well-dispersed locations may be tolerated without effecting any substantial interruption in the uniformity of gas flow through the bed, it is obvious that for most efficient operation the passageways must be kept as free as possible. With passageways of circular cross-section, as shown in Fig. 5, a ball resting directly over the opening will, of course, block the passageway. To prevent two or more adjacent passageways from being simultaneously blocked, the center-to-center distance between the openings divided by the diameter of the balls should not be capable of being expressed as a whole number. As an alternative construction which will effectively accomplish the same purpose, the openings 19 may be rectangular in cross-section, such as square or oblong, so that the openings cannot become blocked. Furthermore, to preclude the possibility that a ball, or a fragment thereof, may enter and become firmly lodged within a circular passageway 19, the passageways are gradually enlarged downwardly, so that a solid particle which may be forced into a passageway will have no difficulty in passing through the same and into and through the wider passageways 15 of the brickwork arch.

The reactor vessel is provided at its upper end with a central or axial gas inlet nozzle 27 having gradually divergent sides in the form of the discharge portion of a venturi, so that the stream of gaseous material passing downwardly through nozzle 27 expands gradually, with resultant decrease in velocity. At diametrically opposite sides of nozzle 27 branch gas inlet nozzles 28 and 29 are provided. Each of the latter nozzles also is gradually divergent, so as to effect a reduction in the velocity of gaseous material passing through the branch inlet nozzles into the central inlet nozzle 27. Central inlet nozzle 27 is the largest of the three gas inlet nozzles and is intended for the introduction of air into the reactor. Side nozzle 28 is somewhat smaller and is intended for introduction of the hydrocarbon feed. Side nozzle 29 also is smaller than nozzle 27 and serves for alternate introduction of steam and hydrogen. A branched supply conduit 31 is provided for separate controlled introduction of steam or hydrogen into nozzle 29. The conventional valves provided in all the supply and discharge lines are provided with control means of known design, not shown, to provide the desired sequence of flow.

The upper ellipsoidal head 12 is provided also with one or more inlet nozzles 32 for the purpose of introducing catalyst into the reactor, and with a manhole 33 for the purpose of providing access into the reactor for the purposes of inspection, repair, etc.

The lower ellipsoidal head 13 is provided with a series of nozzles for the purpose of removing gaseous products and other material from the plenum 17, and also with means for providing access into the plenum for inspection and repair, such as the centrally located manhole 34. Equidistantly spaced from the vertical axis of the reactor, and at opposite ends of a diameter thereof, there are two gas outlet nozzles 35 and 36, of approximately equal size, for gaseous regeneration product and conversion product discharge, respectively.

At the lower end of outlet nozzle 35, and preferably as close to its control valve as may be practicable, there is provided a side branch nozzle 37, also valve controlled, through which evacuation of plenum 17 may be effected following the discharge of the gaseous regeneration products through outlet nozzle 35.

Figure 3:
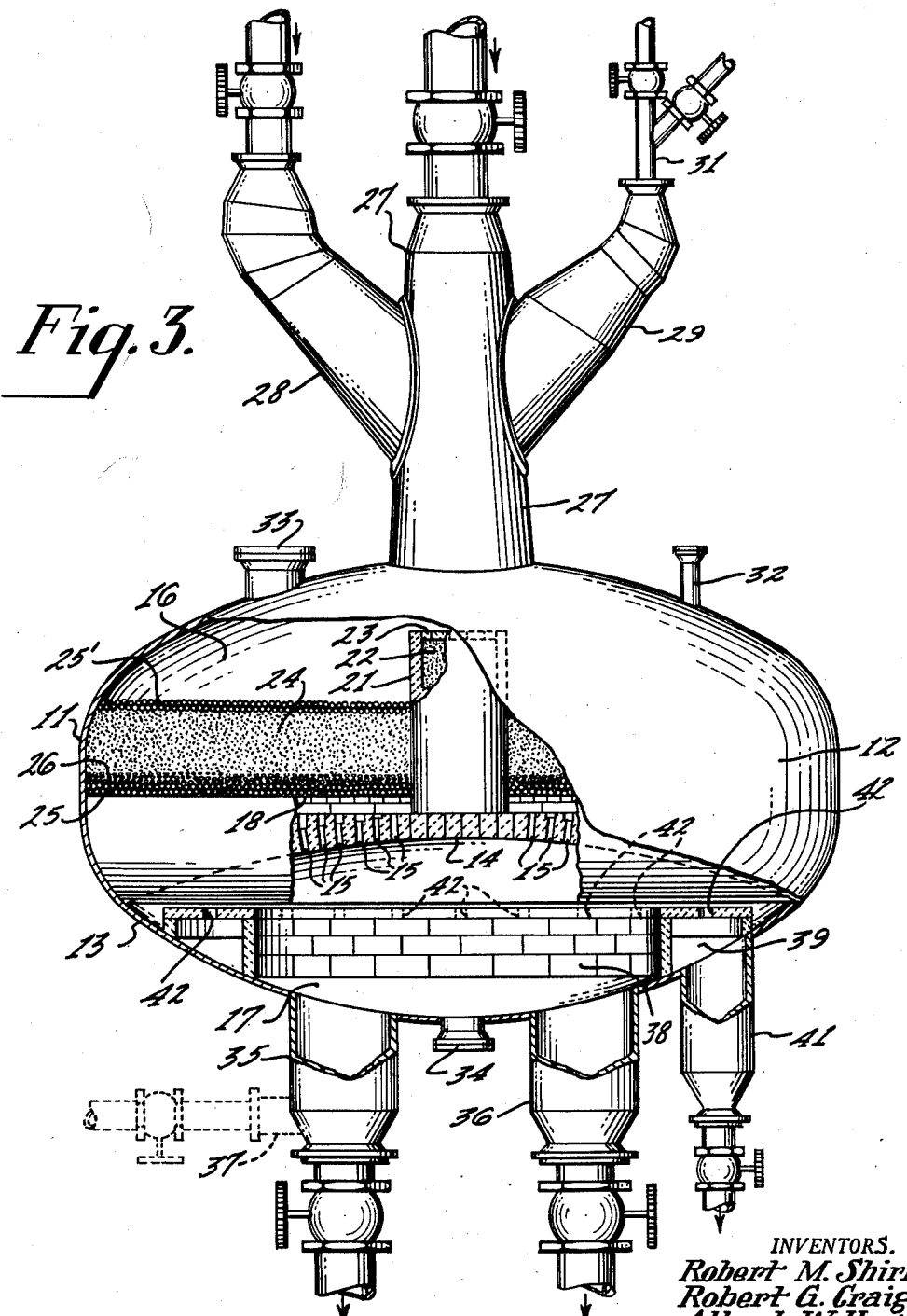
Fig. 3 is a modified form of the reactor shown in Fig. 1.

In the modification of the invention shown in Fig. 3, a second manifold 38 is provided at the bottom of the large plenum or manifold 17 and forms with the lower head 13 a continuous confined channel 39. A discharge nozzle 41 is arranged to discharge gaseous material from the manifold channel 39. In the drawing, manifold 38 is shown as a cylindrical brickwork structure set in the bottom of the plenum 17. The manifold may conveniently be fabricated of the same type of brick or tile used in the construction of partition 14 and pier 21, or it may be fabricated of other suitable material, such as metal. The horizontal wall of manifold 38 is provided with a circumferential row of openings 42 extending along the entire length of the circular manifold and arranged to provide gaseous communication between plenum 17 and the channel 39. Gaseous material to be evacuated through outlet nozzle 41 is withdrawn from the plenum 17 through the openings 42 and through the channel passageway 39. Openings 42 impose a pressure drop on the flow of gas into the channel 39 thereby causing a more uniform collection of gaseous material along the channel.

With evacuation being effected through plenum or manifold 39 and nozzle 41, there is the possibility that, following the discharge of hydrocarbons through nozzle 36, left-over hydrocarbons may have settled in the nozzle 35. If such left-over hydrocarbons are withdrawn into the regeneration product discharge line, which line normally contains an oxygen-rich gaseous mixture, there will be undesirable combustion of the hydrocarbons in the discharge line associated with nozzle 35. To safeguard against such eventuality left-over hydrocarbons may be evacuated from nozzle 35 through side nozzle 37 immediately preceding the withdrawal of regeneration products.

Inasmuch as the particular hydrocarbon conversion may be carried out at relatively high temperatures, the reactor vessel and its various inlet and outlet nozzles may be provided in known manner with a protective lining to protect the external metal surfaces of the vessel and the nozzles against injury as a result of the excessive temperatures. Conventional refractory lining materials, such as brick or tile, may be used in those areas where they may be conventionally affixed to the walls of the vessel and a mastic refractory material may be applied in known manner at the joints and in the areas where the use of fabricated refractory material is impractical.

The ellipsoidal reactor of the present invention possesses certain inherent advantages not to be found in the reactors, such as horizontal cylindrical reactors heretofore employed.

With respect to advantages obtained by reason of the ellipsoidal configuration of the reactor and the axial placement of the gas inlet nozzle, it is obvious that the symmetrical arrangement provides uniform distances of flow in all directions from the central region of gas introduction to the peripheral area of the catalyst bed. There is thus effected a more rapid and uniform distribution of gaseous material over and into the surface of the bed. This is especially desirable in view of the shallowness of the bed. Considering the stated size range of the catalytic material and the balls of inert material forming the top and bottom layers of the bed, it is apparent that the pressure drop through a bed of the proportions illustrated would normally be less than one pound, and quite possibly in the order of about one-half pound.

With respect to the matter of gas introduction, the divergent nozzle 27 together with divergent side nozzles 28 and 29 provide a distinct advantage in the way of velocity reduction of the gas. Since gas velocities in the supply conduits tend to be at a level far in excess of the maximum velocity that can be tolerated at the surface of the bed, such velocity reduction prevents disturbance of the catalyst. Any substantial displacement of catalyst would of course produce considerable variation in bed depth, with consequent uneven pressure drop and uneven gas flow through the bed.

Normal economic operation requires air and hydrocarbon velocities of 300–400 ft./sec. through the motor operated valves generally installed in the gas supply system. In some instances line velocities of the gas may be in excess of 1,000 ft./sec.

Through the use of gradually divergent nozzles such excessive gas velocities may be reduced to about 150 ft./sec., at which velocity baffling or deflection of the incoming gas stream by a device such as pier 21 provides a cross-flow velocity over the surface of the bed which will not disturb the catalyst or other granular particles.

From a structural standpoint, the masonry or brickwork arch 14 and the brickwork pier 21 provide a superior construction having process and maintenance advantages.

While the gas inlet nozzle 27 comprises a main axial member and two side branch members 28 and 29, it is to be understood that the invention is not limited to a construction in which a gradually divergent nozzle is provided in each of the side gas supply lines. If desired, the nozzle members 28 and 29 may be eliminated, and the hydrocarbons, steam and hydrogen may be introduced at a higher level in the air line, so that all velocity reduction is effected by the single nozzle member 27.

Furthermore, in connection with the manifold 38 it is to be understood that the invention is not limited to the particular configuration illustrated in Fig. 3. The manifold structure 38 may, for example, be rectangular in horizontal cross section, or may be in any form suitable to effect the desired purpose.

For a clearer understanding of the nature of the present invention and its applicability to known systems for effecting hydrocarbon conversions reference may be had to U.S. Patent No. 2,423,029, issued June 24, 1947, to E. J. Houdry.

While the invention has been shown in but two forms, it will be obvious to those skilled in the art that it is susceptible of further modification without departing from the spirit thereof, and it is desired therefore that only such limitations be placed thereon as are imposed by the scope of the appended claims.

What is claimed is:

1. A hydrocarbon dehydrogenation reactor comprising a closed vessel having a relatively-short vertical cylindrical midsection and semi-ellipsoidal top and bottom sections; a perforate horizontal grid extending across said midsection so as to divide said vessel into an upper reaction chamber and a lower gas-collecting plenum, the region within said midsection and above said grid comprising a reaction zone adapted to contain a fixed bed of granular material including catalyst; a gradually-divergent main inlet nozzle at the top of said vessel, discharging centrally downward therein and providing the sole inlet for gaseous material into said reaction chamber; a plurality of gradually-divergent branch inlet nozzles communicating with said main inlet nozzle through the sides thereof and discharging downwardly at an acute angle to the main path of flow; means for selectively introducing controlled amounts of gaseous hydrocarbon reactants, purging gas, oxygen-containing gas, and reducing gas into said reaction chamber through said main and branch nozzles; a pier extending centrally upward from the surface of said grid through said reaction zone and terminating at a location directly in the path of the gas stream discharging from said main nozzle and at a substantial distance above the surface of said bed of granular material, the top of said pier having a horizontal surface which serves as a baffle to laterally deflect the incoming gaseous material so as to distribute the gas substantially uniformly over the surface of said bed; and gas outlet means in the bottom of said vessel, communicating with said plenum chamber for the withdrawal of gaseous material therefrom.

2. A reactor as in claim 1 in which said grid comprises an open brickwork structure having a surface layer of perforate tiles, the perforations of the tiles and the interstices between the bricks being arranged to form narrow passageways providing open communication between said reaction chamber and said plenum, and said tile perforations being of such size and shape as to prevent the admission of the granular material forming the lowermost region of said bed while permitting continuous admission of said gaseous material.

3. A reactor as in claim 2, in which said perforations in said tile are of progressively increased size downwardly.

4. A reactor as in claim 1, in which said gas outlet means in the bottom of said vessel comprise two valve-controlled nozzles located diametrically opposite and equidistantly from the vertical axis of said vessel; one of said outlet nozzles being provided with a valve-controlled branch outlet nozzle at a location above and adjacent to its respective control valve.

5. A reactor as in claim 1 in which said main gas inlet nozzle and said branch inlet nozzles at the sides thereof are individual to the separate streams of gaseous material being introduced to said reactor.

6. A reactor as in claim 4 including a concentric ring manifold at the bottom of said vessel surrounding said outlet nozzles, said ring manifold having along its entire circumference and in open communication with said plenum a plurality of restricted openings which impose on the flow of gas therethrough a pressure drop sufficient to provide uniform withdrawal of gaseous material along said manifold; and gas outlet means in said manifold.

References Cited in the file of this patent

UNITED STATES PATENTS

| | | |
|---|---|---|
| 938,919 | Tully | Nov. 2, 1909 |
| 1,400,912 | Reid | Dec. 20, 1921 |
| 2,195,738 | Ridler | Apr. 2, 1940 |
| 2,212,583 | Broderson | Aug. 27, 1940 |
| 2,247,181 | Berhoudar | June 24, 1941 |
| 2,399,560 | Murphree | Apr. 30, 1946 |
| 2,459,449 | Oliver | Jan. 18, 1949 |
| 2,535,944 | Matby | Dec. 26, 1950 |
| 2,681,273 | Odell | June 15, 1954 |
| 2,720,450 | Haug | Oct. 11, 1955 |

FOREIGN PATENTS

| | | |
|---|---|---|
| 1,087,380 | France | Aug. 25, 1954 |